US012647512B2

(12) United States Patent
Kee et al.

(10) Patent No.: US 12,647,512 B2
(45) Date of Patent: *Jun. 2, 2026

(54) METHOD AND APPARATUS FOR IDENTIFYING A FAKE VIDEO CALL

(71) Applicant: MOTOROLA SOLUTIONS, INC., Chicago, IL (US)

(72) Inventors: Chew Yee Kee, Bayan Lepas (MY); Guo Dong Gan, Kuala Lumpur (MY); Mun Yew Tham, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,635

(22) Filed: Jun. 26, 2024

(65) Prior Publication Data

US 2024/0348720 A1 Oct. 17, 2024

Related U.S. Application Data

(63) Continuation of application No. 17/000,542, filed on Aug. 24, 2020, now Pat. No. 12,047,529.

(51) Int. Cl.
| | |
|---|---|
| *H04M 3/22* | (2006.01) |
| *H04L 9/40* | (2022.01) |
| *H04N 7/14* | (2006.01) |
| *G06Q 50/26* | (2012.01) |

(52) U.S. Cl.
CPC ...... *H04M 3/2281* (2013.01); *H04L 63/0869* (2013.01); *H04N 7/147* (2013.01); *G06Q 50/26* (2013.01); *H04M 2203/2027* (2013.01); *H04M 2203/251* (2013.01); *H04M 2203/6027* (2013.01); *H04M 2242/04* (2013.01)

(58) Field of Classification Search
None
See application file for complete search history.

(56) References Cited

U.S. PATENT DOCUMENTS

| | | | |
|---|---|---|---|
| 8,149,264 | B2 | 4/2012 | Franceschini et al. |
| 8,558,953 | B2 | 10/2013 | Black |
| 9,215,639 | B2 | 12/2015 | Khay-Ibbat et al. |
| 2016/0173693 | A1 | 6/2016 | Spievak et al. |
| 2016/0300110 | A1 | 10/2016 | Prosek |
| 2016/0316049 | A1 | 10/2016 | Byrne et al. |

(Continued)

FOREIGN PATENT DOCUMENTS

| | | |
|---|---|---|
| WO | 2010149373 A1 | 12/2010 |
| WO | 2019226964 A1 | 11/2019 |

OTHER PUBLICATIONS

Lorkiewicz, Maeusz, et al.: "Algorithm for real-time comparison of audio streams for broadcast supervision", Jun. 1, 2018, 2018 25th International Conference on Systems, Signals and Image Processing (IWSSIP) (pp. 1-5).

*Primary Examiner* — Bassam A Noaman

(57) ABSTRACT

A method and apparatus for identifying a faked video is provided herein. During operation, when a video, or video call is received from a device, a simultaneous audio call is placed to the device (i.e., the video call and audio call take place simultaneously in time). The audio streams on both the video and audio call are compared, and a difference between the audio streams is identified. The video is deemed a potential fake if the difference between the audio streams is above a particular threshold.

17 Claims, 3 Drawing Sheets

301 — RECEIVING A VIDEO CALL FROM A USER OVER A FIRST CHANNEL, WHEREIN THE VIDEO CALL COMPRISES A FIRST AUDIO STREAM

303 — IN RESPONSE TO THE STEP OF RECEIVING THE VIDEO CALL, PLACING A SIMULTANEOUS AUDIO CALL TO THE USER ON A SECOND CHANNEL

305 — RECEIVING THE AUDIO CALL FROM THE USER OVER THE SECOND CHANNEL, WHEREIN THE AUDIO CALL COMPRISES A SECOND AUDIO STREAM

307 — COMPARING THE FIRST AND THE SECOND AUDIO STREAMS

309 — DETERMINING IF THE VIDEO CALL IS POTENTIALLY FAKE BASED ON THE COMPARISON OF THE FIRST AND THE SECOND AUDIO STREAMS

(56) References Cited

U.S. PATENT DOCUMENTS

| 2017/0111497 A1 | 4/2017 | Starr |
| 2018/0316944 A1* | 11/2018 | Todd ................. H04N 21/6587 |
| 2019/0052474 A1 | 2/2019 | Dizengof |
| 2020/0065526 A1 | 2/2020 | Berman |

* cited by examiner

*100*

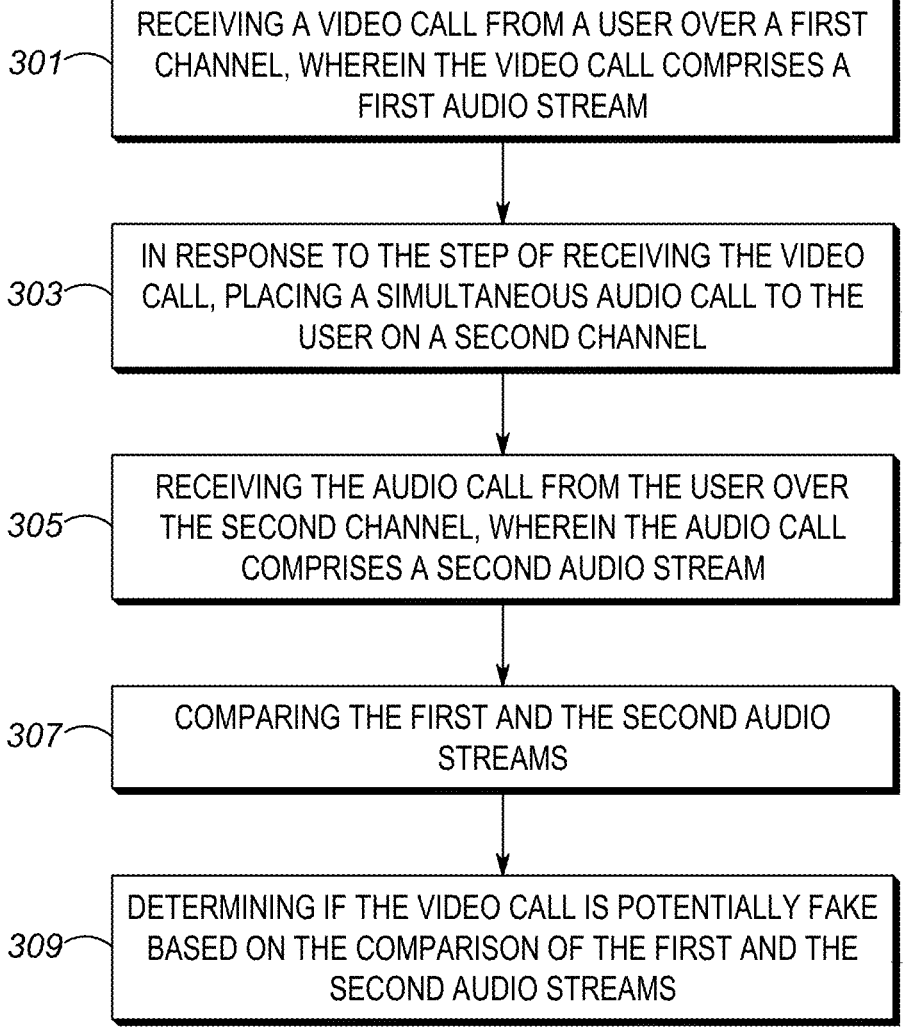

301 — RECEIVING A VIDEO CALL FROM A USER OVER A FIRST CHANNEL, WHEREIN THE VIDEO CALL COMPRISES A FIRST AUDIO STREAM

303 — IN RESPONSE TO THE STEP OF RECEIVING THE VIDEO CALL, PLACING A SIMULTANEOUS AUDIO CALL TO THE USER ON A SECOND CHANNEL

305 — RECEIVING THE AUDIO CALL FROM THE USER OVER THE SECOND CHANNEL, WHEREIN THE AUDIO CALL COMPRISES A SECOND AUDIO STREAM

307 — COMPARING THE FIRST AND THE SECOND AUDIO STREAMS

309 — DETERMINING IF THE VIDEO CALL IS POTENTIALLY FAKE BASED ON THE COMPARISON OF THE FIRST AND THE SECOND AUDIO STREAMS

*FIG. 3*

METHOD AND APPARATUS FOR IDENTIFYING A FAKE VIDEO CALL

BACKGROUND OF THE INVENTION

Currently, many emergency 911 dispatch centers can receive emergency notifications from the public via a normal voice call, and via texting. We envision a future wherein addition to the usual 911 calls, the public can make a live video call with the 911 call-taker. However, with video calls comes new threats. Particularly, there is a possibility that the public may stream fake videos to the 911 call-taker with malicious intentions. Thus, there is a need for a simple and rapid method to identify a fake video in real-time and offer actionable intelligence to the 911 call-taker.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 3 is a flow chart showing operation of the dispatch center of FIG. 2.

Figure 1:
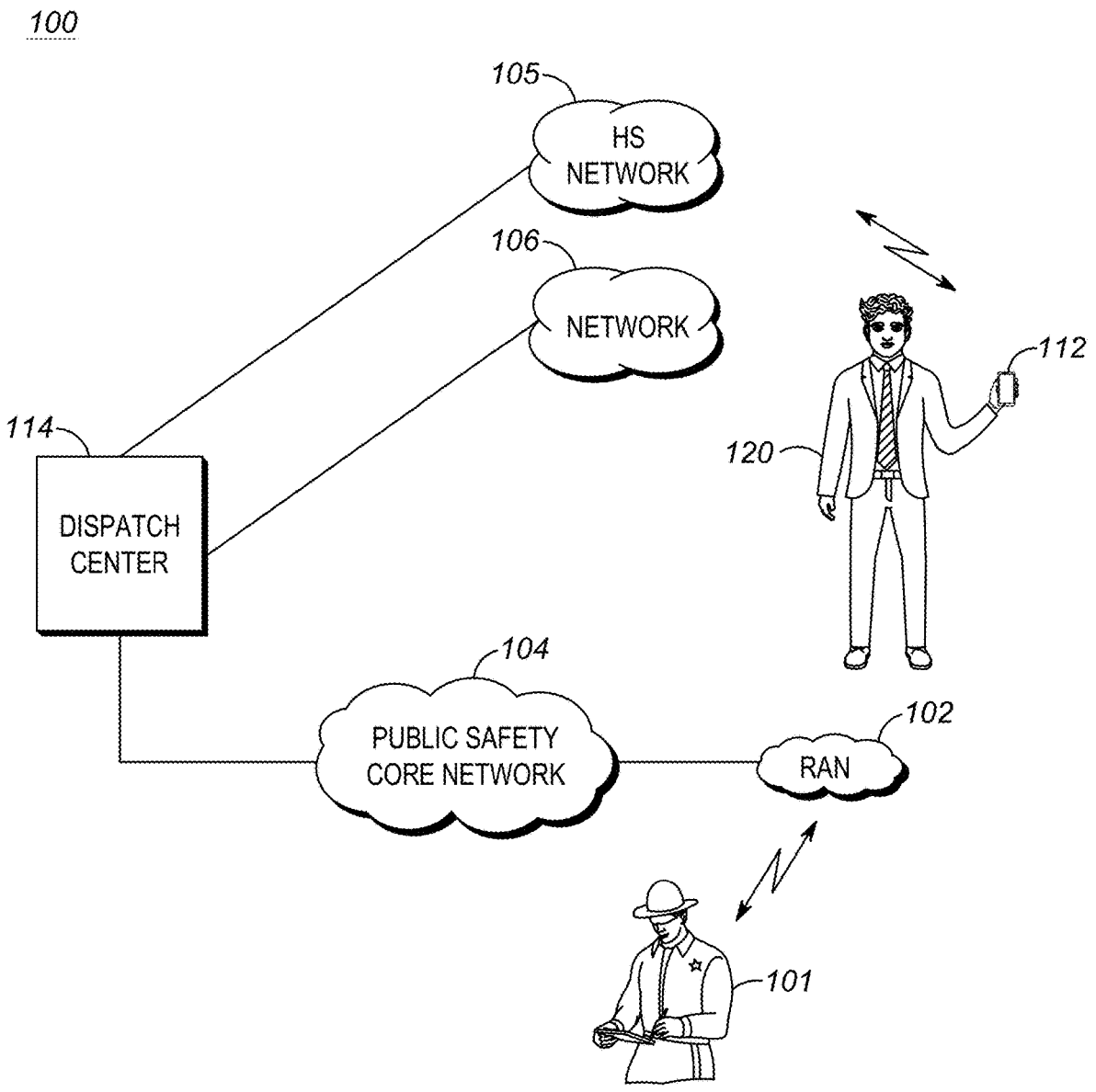
FIG. 1 shows a general operating environment for the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above mentioned need, a method and apparatus for identifying a faked video is provided herein. During operation, when a video, or video call is received from a device, a simultaneous audio call is placed to the device (i.e., the video call and audio call take place simultaneously in time). The audio streams on both the video and audio call are compared, and a difference between the audio streams is identified. The video is deemed a potential fake if the difference between the audio streams is above a particular threshold.

The video call and the audio call take place on separate channels so that audio from a first channel is compared to audio from a second channel to determine if the difference between the audio streams is above the particular threshold. For example, a first channel may comprise a channel used for voice calls within a first network being utilized, while the second channel may be a channel used for high-speed data and video calls within the first network, or within a differing second network.

Expanding on the above, assume that a 911 call-taker receives a video emergency call from a user device (e.g. a smart phone) via a first network (e.g. broadband network) on a first channel. In response to receiving the video emergency call from the user's smart phone, the dispatch system will have a second call initiated to the smart phone on a second channel. As described, the second call is preferably an audio call using a second network and the second channel (e.g. a cellular network). The audio streams on both the video call and audio call are compared, and the operator is warned if the video is deemed a potential fake. The warning preferably takes place via a visual message to the operator on a computer screen, however, an audible message may be given as well.

In another example, the audio call may be placed by a user of the smart phone prior to video being sent. For example, assume somebody calls 911 reporting a fire at a particular location. The dispatch operator may request a video of the scene be provided by the caller. If the caller provides video to the dispatch operator, then both the audio of the original call, and the audio from the subsequent video are compared, and the operator is warned if the video is deemed a potential fake.

Once a video is deemed a potential fake, the 911 call-taker is warned via an audible or visual message on a graphical-user interface. The 911 call-taker may take action to convince them that the video is indeed a fake. For example, certain actions can be taken by the dispatcher that will affect the outcome in the video stream such as asking the caller to tilt the video camera or pan the video camera or even insert objects or remove objects in the video camera field-of-view (FOV). If this cannot be done by the caller, there is a high probability that the video is fake.

Turning now to the drawings wherein like numerals designate like components, FIG. 1 is a general operating environment 100 for the present invention. Environment 100 includes one or more radio access networks (RANs) 102, a public-safety core network 104, smart device 112, networks 105 and 106, and computer 114 serving as an emergency dispatch center. As described, a one embodiment of the present invention, computer 114 serves as a public-safety dispatch center 114, however, the functionality of computer 114 may not necessarily be located at a dispatch center. Additionally, as shown in FIG. 1, several separate networks exist, namely public-safety core network 104, and public networks 105 and 106 (e.g., Verizon, Spring, AT&T, . . . , etc.). Network 104 comprises a standard cellular network configured to facilitate standard wireless calls between devices, while network 105 comprises a high-speed data network configured to facilitate video calls between devices.

Each RAN 102 includes typical RAN elements such as base stations, base station controllers (BSCs), routers, switches, and the like, arranged, connected, and programmed to provide wireless service to user equipment (e.g., tablet computer 116 operated by officer 101) in a manner known to those of skill in the relevant art.

In a similar manner, networks 105 and 106 includes elements (which may be shared) such as base stations, base station controllers (BSCs), routers, switches, and the like, arranged, connected, and programmed to provide wireless service to user equipment 112 (e.g., smart phone 112 operated by user 120) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications to officer 101.

Smart device 112 may be any suitable computing and communication devices configured to engage in wireless communication over an air interface as is known to those in the relevant art (such as a smart phone). Such wireless communication may comprise a standard cellular telephone call, or a video call. The calls may be placed or received simultaneously. Smart device 112 may comprise any device capable of participating in such calls. For example, smart device 112 may comprise a mobile device running an Android™ or iOS™ operating system and having a camera.

Finally, computer 114 is part of a computer-aided-dispatch center, preferably manned by an operator and configured to receive video, video calls, and audio calls from device 112 and to provide information to officer 101 (via core network 104 and RAN 102) about any emergency. For example, computer 114 typically comprises a graphical user interface that provides the dispatch operator necessary information about public-safety incidents. As discussed above, a video call may be received at dispatch center 114 from device 112 over a first network 105. Additionally, a simultaneous audio call may be received by dispatch center 114 from device 112 over a second network 106.

During operation, dispatch center 114 is configured to place/receive an audio call over network 106 to/from device 112 when any video, or video call is received from device 112 over network 105. It should be noted that when any call (video or audio) is received from device 112, dispatch center 114 will be provided with an identification of device 112 as part of normal call procedures. This allows dispatch center 114 to place audio calls to device 112.

When both an audio call, and video (e.g. a video call) are simultaneously received from device 112, their audio streams are compared and potential fake videos are identified.

Figure 2:
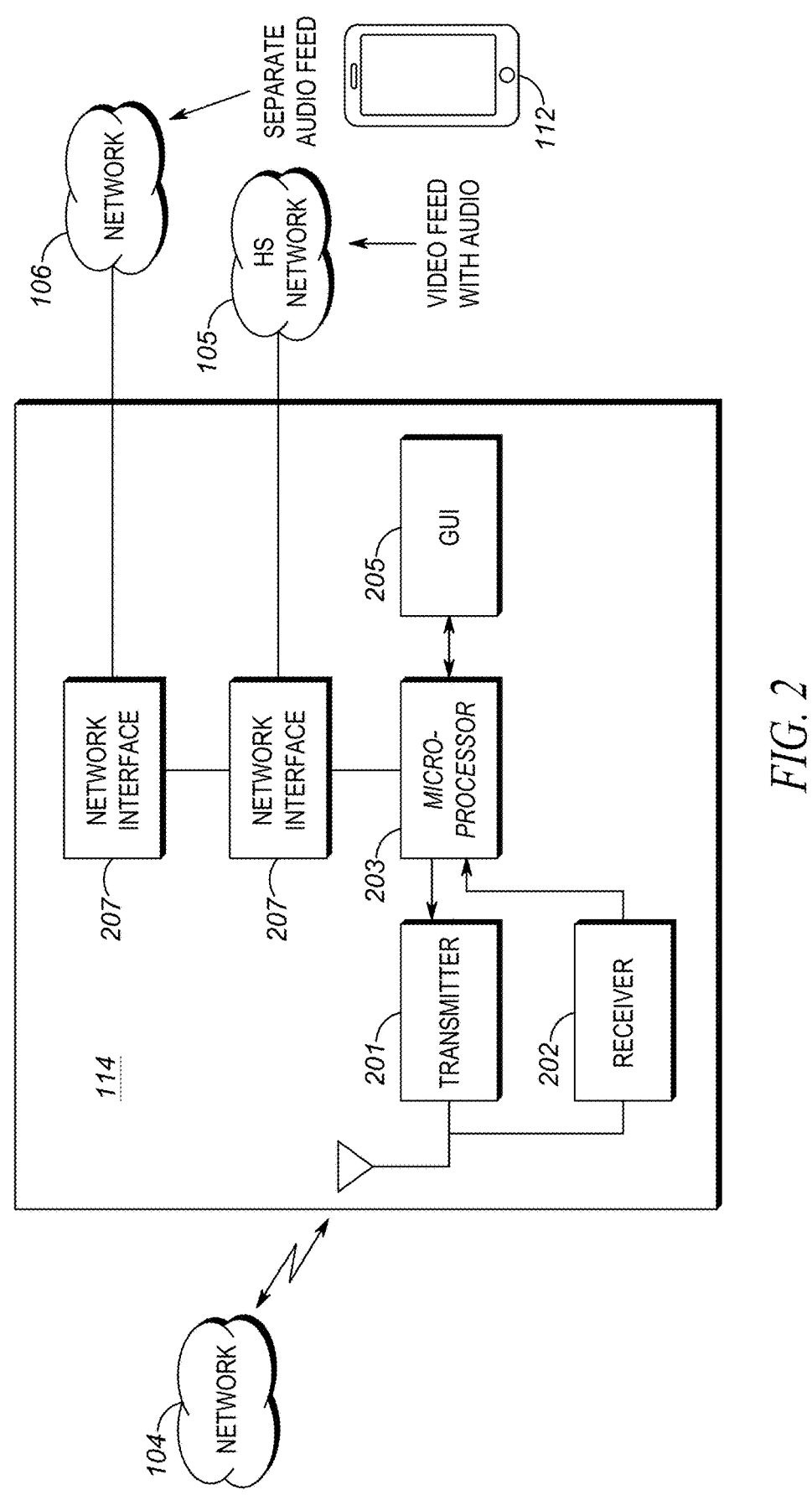
FIG. 2 is a block diagram of a dispatch center of FIG. 1.

FIG. 2 is a block diagram of the dispatch center of FIG. 1. As shown, dispatch center 114 may include transmitter 201, receiver 202, graphical user interface (GUI) 205, network interfaces 207, and logic circuitry 203. In other implementations, dispatch center 114 may include more, fewer, or different components.

Transmitter 201 and receiver 202 are preferably wireless, and may be long-range and/or short-range transceivers that utilize a private 802.11 network set up by a building operator, a next-generation cellular communications network operated by a cellular service provider, or any public-safety network such as an APCO 25 network or the FirstNet broadband network. Transmitter 201 and receiver 202 may also contain multiple transmitters and receivers, to support multiple communications protocols simultaneously.

Graphical user Interface (GUI) 205 comprises a screen (e.g., a liquid crystal display (LCD), organic light-emitting diode (OLED) display, surface-conduction electron-emitter display (SED), plasma display, field emission display (FED), bistable display, projection display, laser projection, holographic display, etc.) that can display images, maps, incident data, warnings about potential fake video, . . . , etc. In order to provide the above features (and additional features), GUI 205 may include a monitor, a keyboard, a mouse, and/or various other hardware components to provide a man/machine interface.

Logic circuitry 203 comprises a digital signal processor (DSP), general purpose microprocessor, a programmable logic device, or application specific integrated circuit (ASIC) and is configured to determine if a received video is potentially fake, as described herein.

In an illustrative embodiment, networks 105 and 106 are attached (i.e., connected) to dispatch center 114 through network interfaces 207 and communicates with processor 203. Networks 105 and 106 are connected via a wired connection to network interfaces 207, although this connection may be wireless in alternative embodiments. Network interfaces 207 includes elements including processing, modulating, and transceiver elements that are operable in accordance with any one or more standard or proprietary wired or wireless interfaces, wherein some of the functionality of the processing, modulating, and transceiver elements may be performed by means of processor 203.

In the illustrative embodiment, network 104 is attached (i.e., connected) to dispatch center 114 through transmitter 201 and receiver 202 both of which communicate with processor 203. Network 104 is connected to dispatch center 114 via a wireless connection, although this connection may be wired in alternative embodiments.

During operation, a video feed is received by logic circuitry 203 from device 112 via network interface 207. In response, device identification data is determined, and a simultaneous audio call is placed to device 112. At this point in time, there will be both a video (video, or video call having its associated audio stream) and an audio call being received from device 112 simultaneously. Logic circuitry 203 will then attempt to determine if the audio stream from the video differs significantly from the audio stream from the voice call. If so, an operator is notified via GUI 205 that the video call may be fake. The operator may take further action (as described above).

Thus, FIG. 2 illustrates an apparatus 114 comprising a network interface 207 configured to receive a video call from a user over a first channel, wherein the video call comprises a first audio stream. A second network interface 207 is provided and configured to receive an audio call from the user over a second channel, wherein the audio call comprises a second audio stream. Logic circuitry 203 is provided and configured to compare the first and the second audio streams and determine if the video call is potentially fake based on the comparison of the first and the second audio streams.

As discussed, the video call may be received over a first network and the audio call may be received over a second network. Additionally, logic circuitry 203 compares the first and the second audio streams by determining a difference in audio and/or latency between the first and the second audio streams (discussed below). Logic circuitry 203 also determines if the video call is potentially fake by determining if the difference in audio and/or latency between the first and the second audio streams is greater than a threshold.

Finally, graphical user interface 205 is provided and configured to warn an operator that the video call is potentially fake. This warning may take the form of a message displayed on a computer screen, or an audible warning given to the operator.

Identifying a Potentially Fake Video

Once both audio streams are being received, logic circuitry 203 may determine if the video is potentially fake. More particularly, audio signatures (or spectrogram) for the two audio streams will be generated and compared to find if there is any similarity between the two audio streams. For example, logic circuitry 203 can identify the peaks in the spectrogram and extract the frequency and timestamp for each of the peaks. Logic circuitry 203 can also identify the time difference between two peaks as part of the audio signature. Once the audio signature is extracted, logic circuitry 203 can compare the audio signatures between the two audio to detect if there is any similarity. Logic circuitry 203 will carry out this comparison until it obtains a good enough similarity score to confidently say that the two audio streams are similar, or not similar. This can be done by splitting the audio into multiple 5 seconds of overlapping segments. If logic circuitry 203 determines that there are 5 overlapping segments that are significantly different from each other, it can assign a rather low similarity score and confidently says that the two audio streams are different and the video is potentially fake. If the audio signatures of the 5 overlapping segments highly match each other, logic circuitry 203 will rank it as the audio streams with high similarity score. If logic circuitry 203 cannot generate a good enough similarity score within 5 overlapping segments, in which, some of the segments match each other and some of the segments are not, logic circuitry 203 will continue the comparison process until it obtains a good enough similarity score.

Once the two audio streams are deemed similar, logic circuitry 203 will start analyzing the latency between the two audio streams. Numerous latency factors will be taken into account in the latency analysis (for example, the video quality and the internet speed in sending and receiving the video). A genuine incident video could potentially have high latency due to the QoS (Quality of Service) as an incident scene is usually crowded with many public uploading media to the internet (e.g. social media). It is expected that a higher video quality with a weaker signal strength may result in a greater latency between the two audio streams. Therefore, the signal strength can be taken into calculation to determine the threshold value of what is the acceptable latency between the two audio streams. The acceptable latency value can be obtained using statistical analysis from a set of historical data, which consist of the video quality, the signal strength, and the resulting latency.

If the latency measured is deemed longer than an unacceptable value, the video could be determined as potentially fake and a warning would be displayed on GUI 205 to increase awareness of the 911 call-taker. This is because a fake video may need to be uploaded to a server for a massive post-processing before it is streamed to the 911 call-taker. The RSSI value could be streamed from the user's device when they are calling 911.

FIG. 3 is a flow chart showing operation of dispatch center 114. In particular, the flow chart of FIG. 3 shows those steps (not all necessary) for determining if a video is potentially fake. The logic flow begins at step 301 where a first network interface 207 receives a video call from a user over a first channel, wherein the video call comprises a first audio stream. In response to the step of receiving the video call, logic circuitry 203 places a simultaneous audio call over a second network interface to the user on a second channel (step 303). The audio call is then received from the user via network interface 207 over the second channel, wherein the audio call comprises a second audio stream (step 305). Logic circuitry 203 then compares the first and the second audio streams (step 307) and determines if the video call is potentially fake based on the comparison of the first and the second audio streams (step 309).

As discussed above, the video call is received over a first network and the audio call is received over a second network. Additionally, as discussed, the step of comparing the first and the second audio streams comprises the step of determining a difference in audio and/or latency between the first and the second audio streams, and the step of determining if the video call is potentially fake comprises the step of determining that the video call is potentially fake if the difference in audio and/or latency between the first and the second audio streams is greater than a threshold. The operator is then warned if the video call is potentially fake, wherein the warning takes place by notifying the operator with a warning message via GUI 205.

In the foregoing specification, specific embodiments have been described. However, one of ordinary skill in the art appreciates that various modifications and changes can be made without departing from the scope of the invention as set forth in the claims below. For example, although multiple calls were placed simultaneously from device 112 over network 105 and network 106, in an alternate embodiment of the present invention, both the video call and the audio call may be placed over a single network, with the audio of both calls being compared as described above. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential feature or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving a video call from a user over a first channel, wherein the video call comprises a first audio stream;
   placing, based on the video call, an audio call to the user on a second channel;
   receiving the audio call from the user over the second channel, wherein the audio call comprises a second audio stream; and
   determining that the video call is fake based on a difference in a latency between the first audio stream and the second audio stream being greater than a threshold latency between the first audio stream and the second audio stream determined based on a quality of service corresponding to the video call.

2. The method of claim 1 wherein the video call is received over a first network and the audio call is received over a second network.

3. The method of claim 1 wherein determining the video call is fake comprises determining the threshold as a threshold latency based on an expected latency between the first audio stream and the second audio stream, wherein the expected latency is based on at least one of: statistical analysis, video quality, and signal strength.

4. The method of claim 1 further comprising comparing the first audio stream and the second audio stream based on determining a difference in audio between the first audio stream and the second audio stream.

5. The method of claim 1 further comprising determining that the second audio stream does not correspond to a portion of the first audio stream associated with an object in a field-of-view of the video call.

6. The method of claim 1 further comprising warning an operator that the video call is fake.

7. A method comprising:
   receiving a video call from a user over a first channel, wherein the video call comprises a first audio stream;
   receiving an audio call from the user over a second channel, wherein the audio call comprises a second audio stream; and
   determining that the video call is fake based on a difference in a latency between the first audio stream and the second audio streams being greater than an expected latency corresponding to the video call, wherein the expected latency is based on at least one of: statistical analysis, video quality, and signal strength.

8. The method of claim 7 wherein the video call is received over a first network and the audio call is received over a second network.

9. The method of claim 7 wherein determining the video call is fake comprises determining the expected latency between the first audio stream and the second audio stream based on a quality of service corresponding to the video call.

10. The method of claim 7 further comprising comparing the first audio stream and the second audio stream based on determining a difference in audio between the first audio stream and the second audio stream.

11. The method of claim 7 further comprising determining that the second audio stream does not correspond to a portion of the first audio stream associated with an object in a field-of-view of the video call.

12. The method of claim 7 further comprising warning an operator that the video call is potentially fake.

13. An apparatus comprising:
   a network interface configured to receive a video call from a user over a first channel, wherein the video call comprises a first audio stream;
   a second network interface configured to receive an audio call from the user over a second channel, wherein the audio call comprises a second audio stream;
   logic circuitry configured to determine that the video call is fake based on a difference in a latency between the first audio stream and the second audio streams being greater than an expected latency corresponding to the video call, wherein the expected latency is based on at least one of: statistical analysis, video quality, and signal strength.

14. The apparatus of claim 13 wherein the video call is received over a first network and the audio call is received over a second network.

15. The apparatus of claim 13 wherein the logic circuitry is further configured to compare the first audio stream and the second audio stream based on being configured to determine a difference in audio between the first audio stream and the second audio stream.

16. The apparatus of claim 13 wherein the logic circuitry is further configured to determine that the second audio stream does not correspond to a portion of the first audio stream associated with an object in a field-of-view of the video call.

17. The apparatus of claim 13 further comprising:

a graphical user interface configured to warn an operator that the video call is fake, wherein the warning comprises text or sound.

* * * * *